United States Patent [19]
Finkelstein

[11] Patent Number: 6,014,446
[45] Date of Patent: Jan. 11, 2000

[54] APPARATUS FOR PROVIDING IMPROVED ENCRYPTION PROTECTION IN A COMMUNICATION SYSTEM

[75] Inventor: Louis David Finkelstein, Wheeling, Ill.

[73] Assignee: Motorola, Inc., Schaumburg, Ill.

[21] Appl. No.: 08/977,769

[22] Filed: Nov. 25, 1997

Related U.S. Application Data

[63] Continuation of application No. 08/877,686, Jun. 17, 1997, abandoned, which is a continuation-in-part of application No. 08/393,975, Feb. 24, 1995, abandoned.

[51] Int. Cl.$^7$ ..................................................... H04L 9/06
[52] U.S. Cl. ............................................. 380/46; 708/252
[58] Field of Search .................................. 380/42, 43, 44, 380/46; 708/252

[56] References Cited

U.S. PATENT DOCUMENTS

| | | | |
|---|---|---|---|
| 5,054,067 | 10/1991 | Moroney et al. .......................... | 380/37 |
| 5,060,265 | 10/1991 | Finkelstein ................................ | 380/46 |
| 5,292,207 | 3/1994 | Degele ...................................... | 380/46 |
| 5,363,448 | 11/1994 | Koopman, Jr. et al. .................. | 380/23 |
| 5,365,585 | 11/1994 | Puhl et al. ................................. | 380/9 |

*Primary Examiner*—Gilberto Barrón, Jr.
*Attorney, Agent, or Firm*—Darleen J. Stockley

[57] ABSTRACT

An encryption apparatus and method generate a unique keystream output value for every frame of bearer traffic to provide encryption protection in a communications system. The keystream output value is generated from the following equations:

$$x(n+1)_{low} = \{x(n)_{low} * R1_{low} + R2_{low}\} \mod R3_{low}$$

$$x(n+1)_{high} = \{x(n)_{high} * R2_{high} + R1_{high}\} \mod R3_{high}$$

where R1, R2, and R3 are linear feedback shift registers and $x(n)$ and $x(n+1)$ represent previous and current output values.

6 Claims, 4 Drawing Sheets

APPARATUS FOR PROVIDING IMPROVED ENCRYPTION PROTECTION IN A COMMUNICATION SYSTEM

This application is a continuation of Ser. No. 08/877,686, filed Jun. 17, 1997, now abandoned, which in turn is a continuation in part of Ser. No. 08/393,975, filed Feb. 24, 1995, now abandoned.

FIELD OF THE INVENTION

The present invention relates to communication systems and, more particularly but not limited to, improved encryption protection within communication systems in which a feedback register output is used as an encryption variable.

BACKGROUND OF THE INVENTION

Many communications systems currently use encryption to enhance security of the systems. These communication systems include but are not limited to communication systems, such as, personal communication systems, paging systems, cellular phone systems, cable systems, as well as other private and public cable, wireline, and wireless voice or data networks. By way of example a typical communication system will be described below; however, it will be appreciated by those skilled in the art that the encryption techniques described can be readily extended to other communication systems without departing from the scope and spirit of the present invention.

Turning now to the typical communication systems, these systems usually include subscriber units (such as mobile, cable boxes, or portable units) which communicate with a fixed network communication unit via communication links. In such communication systems, the communication link is the primary target for cryptographic systems, because it is the most vulnerable to unauthorized introduction (spoofing) or extraction (eavesdropping) of information. It is well known in the art that information in these communication links may be cryptographically protected by encrypting them with a pseudonoise (PN) signal which is pseudo-random in nature. For example this may be accomplished by performing an exclusive-or operation of an information signal with a PN signal, prior to transmission. Subsequently, the inverse operation can be performed during the receiving process.

The PN signals are not truly random, but appear random when subject to cursory inspection. The advantage of these PN signals is that they can be easily generated by a linear feedback shift register (LFSR). An LFSR generates a PN signal which is periodic and deterministic. The periodicity of the PN signal is dependent on the number of stages (i.e., bits stored) in the register, the feedback "taps", and the initial state of the LFSR stages. The LFSR implements an Nth degree polynomial (where N is the number of stages of the LFSR) by having one feedback signal "tap" (output bit of a stage) for each coefficient of the polynomial. An input bit is formed from an exclusive-or operation on the outputs or selected outputs of these feedback signal "taps" and fed back into the register. Ideally feedback "taps" can be chosen which implement a maximal length PN signal generator. A maximal length PN generator generates a pseudo-random sequence which repeats every $2^N-1$ cycles, where N is the number of stages in the register. Examples of maximal length feedback tap arrangements for several different stage length registers are given in "Error-Correcting Codes", second edition by W. Wesley Peterson and E. J. Weldon, Jr., MIT Press, 1972.

The problem with using this form of PN generators to cryptographically protect an information signal is that they are extremely vulnerable to attack (i.e., the encryption is easy to crack or break). The weakness of PN generators which are based on an LFSR is primarily due to the inherent linearity of the generators. Since PN generators operate according to an algorithm, knowledge of the algorithm reveals the entire sequence. Further, as noted in chapter 5 of "Cipher Systems" by Henry Baker and Fred Piper, Northwood Publications, 1992, a cryptoanalyst needs only 2N bits of plaintext and corresponding ciphertext for an N stage long LFSR to be able to determine the feedback "taps", the initial state of the LFSR, and ultimately any PN signal output by the LFSR. This vulnerability represents a major drawback to the continued use of the LFSR to cryptographically protect communication systems.

To address this vulnerability various forms of introducing non-linearity into the basic LFSR structure have been discussed. Two such discussions, both assigned to the same assignee as here and incorporated herein by reference, are 1) U.S. Pat. No. 5,060,265 by Finkelstein issued on Oct. 22, 1991 and titled Method Of Protecting A Linear Feedback Shift Register (LFSR) Output Signal" and 2) U.S. Pat. No. 5,365,585 by Puhl et al. issued on Nov. 15, 1994 and titled "Method And Apparatus For Encryption Having A Feedback Register With Selectable Taps". While either reference teaches an approach for improving cryptographic protection practitioners continue to require additional protection and encryption processors having higher cryptographic throughput.

Another class of PN generator is the linear congruential generator (LCG). An LCG has the form:

$x(n+1) = \{a*x(n)+b\}$ mod c, where; the constants a, b, c are defined as a=the multiplier, b=the increment, c=the modulus, x(0) is the first (given) value in the sequence.

The sequence generated is then the values x(0), x(1), x(2), . . . Since LCGs are linear they are also vulnerable to cryptographic attack for the same or similar reasons cited regarding LFSRs.

Therefore, a need continues to exist for improved encryption protection techniques for communication systems, which techniques may alleviate these problems.

BRIEF DESCRIPTION OF THE DRAWINGS

The features of the present invention which are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Figure 1:
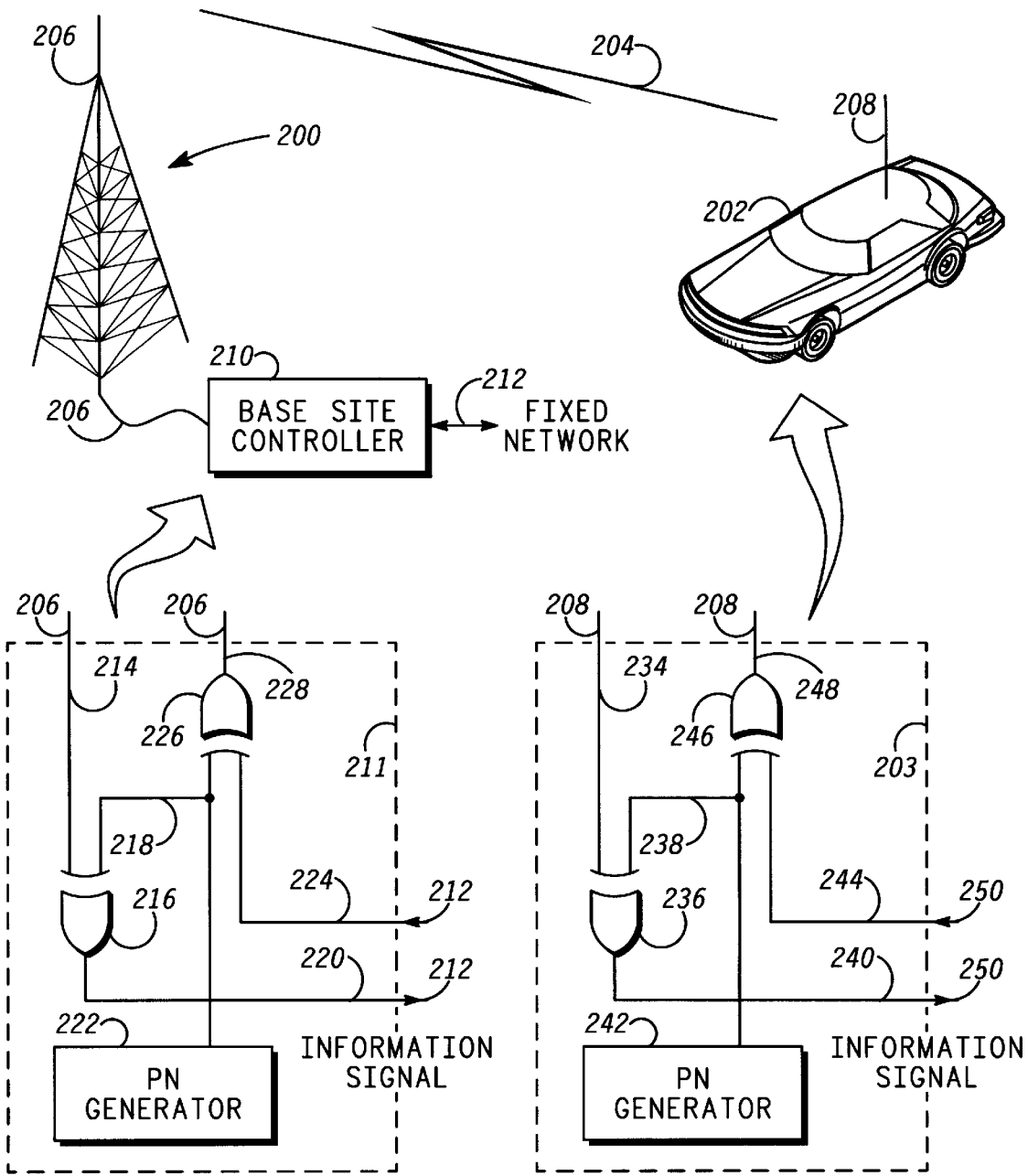
FIG. 1 is a block diagram showing a preferred embodiment cryptographic process for use in a communication system having a subscriber unit and a fixed network communication unit in accordance with the present invention.

Referring now to FIG. 1, a preferred embodiment cryptographic process for use in a communication system having a subscriber communication unit 202 and a fixed network communication unit 200 (i.e., base station) in accordance with the present invention is shown. The fixed network communication unit 200 is connected to other parts of the fixed network through a base controller 210 by a coupler 212. The other parts of the fixed network may include, but are not limited to, other communication units, central controllers, communication system switches, or an access port on the public switched telephone network (PSTN). In operation, an information signal (i.e., a voice and/or data signal) is input to the communication system from either the fixed network (via coupler 212) or from other parts of the subscriber communication unit 202. Subsequently, the information signal is encrypted and transmitted over the communication channel 204, as well as received and decrypted by the communication unit which did not transmit the information signal (i.e., either the fixed network communication unit 200 or the subscriber communication unit 202, respectively).

By way of example, the communication of an information signal from the fixed network communication unit 200 to the subscriber communication unit 202 will be described below. An information signal 212 is input to the base controller 210 of the fixed network communication unit 200. The base controller 210 may perform several other operations in conjunction with communicating the information signal 212 besides providing cryptographic protection. These other operations may include but are not limited to error protection encoding, voice encoding (vocoding), channel coding, modulation, and signal power amplification. However, these other operations may be performed in a number of different methods which are well known in the art. As such these other operations will not be discussed further in the following description so that the it may be focused specifically on a preferred embodiment cryptographic protection scheme of the present invention.

Once the information or plaintext signal 212 is input to the base controller at an encryption engine 211, the information signal is encrypted. The encryption in one preferred embodiment is accomplished by providing the incoming information signal 212, 224 to an exclusive-or (XOR) gate 226 which combines it with a pseudo-random signal 218 from a PN generator 222. In the preferred embodiment, the pseudo-random signal 218 is a non-linear signal. Various schemes by which this non-linear pseudorandom signal 218 may be generated will be discussed later in reference to additional FIGS. 2 and 4. The output 228 of XOR gate 226 is an encrypted information signal. This encrypted information signal 228 may be further processed by the base controller 210 prior to being operatively coupled through a signal transmission line to antenna 206 for subsequent transmission over radio communication channel 204. It will be appreciated by those skilled in the art that the incoming information signal 224 may be combined according to some other function (i.e., not an XOR function) without departing from the scope and spirit of the present invention. An alternative preferred embodiment for encrypting the information signal will be described below with reference to FIGS. 3A and 3B.

A subscriber unit 202 receives the encrypted information signal at an encryption engine 203 via an antenna and signal transmission line 208. The received encrypted information signal 208, 234 is input to an XOR gate 236 which combines it with a pseudo-random signal 238 from a PN generator 242 to decrypt the information signal. It will be appreciated that PN generator 242 must be synchronized with PN generator 222 so that the PN signal 218, 238 output by both PN generators is in synch with the encrypted information signal. When the PN signal 238 is properly synchronized with the received encrypted information signal 234, the output 240 of the XOR gate 236 is a decrypted information signal. This decrypted information signal 240 may be further processed by the subscriber unit 202 prior to being output from the subscriber unit 202 as information signal 250.

In a similar manner, an information signal may be communicated from the subscriber communication unit 202 to the fixed network communication unit 200. An information signal 250 is input to a subscriber unit 202 at an encryption engine 203. The incoming information signal 250, 244 is encrypted with a nonlinear pseudo-random signal 238 by an XOR gate 246. The encrypted information signal output 248 of the XOR gate 246 is coupled on a transmission line to an antenna 208 and transmitted on a radio communication channel 204. The fixed network communication unit 200 receives encrypted information signal 206 and provides it to base site controller 210 at an encryption engine 211. Encryption engine 211 combines the received encrypted information signal 206, 214 with a non-linear pseudo-random signal 218 by XOR gate 216 to decrypt the information signal. The non-linear pseudo-random signal 218 is synchronized with the non-linear pseudo-random signal 238 that was originally used to encrypt the information signal. XOR gate 216 outputs a decrypted information signal 220 which is then provided to the fixed network through a coupler 212.

Figure 2:
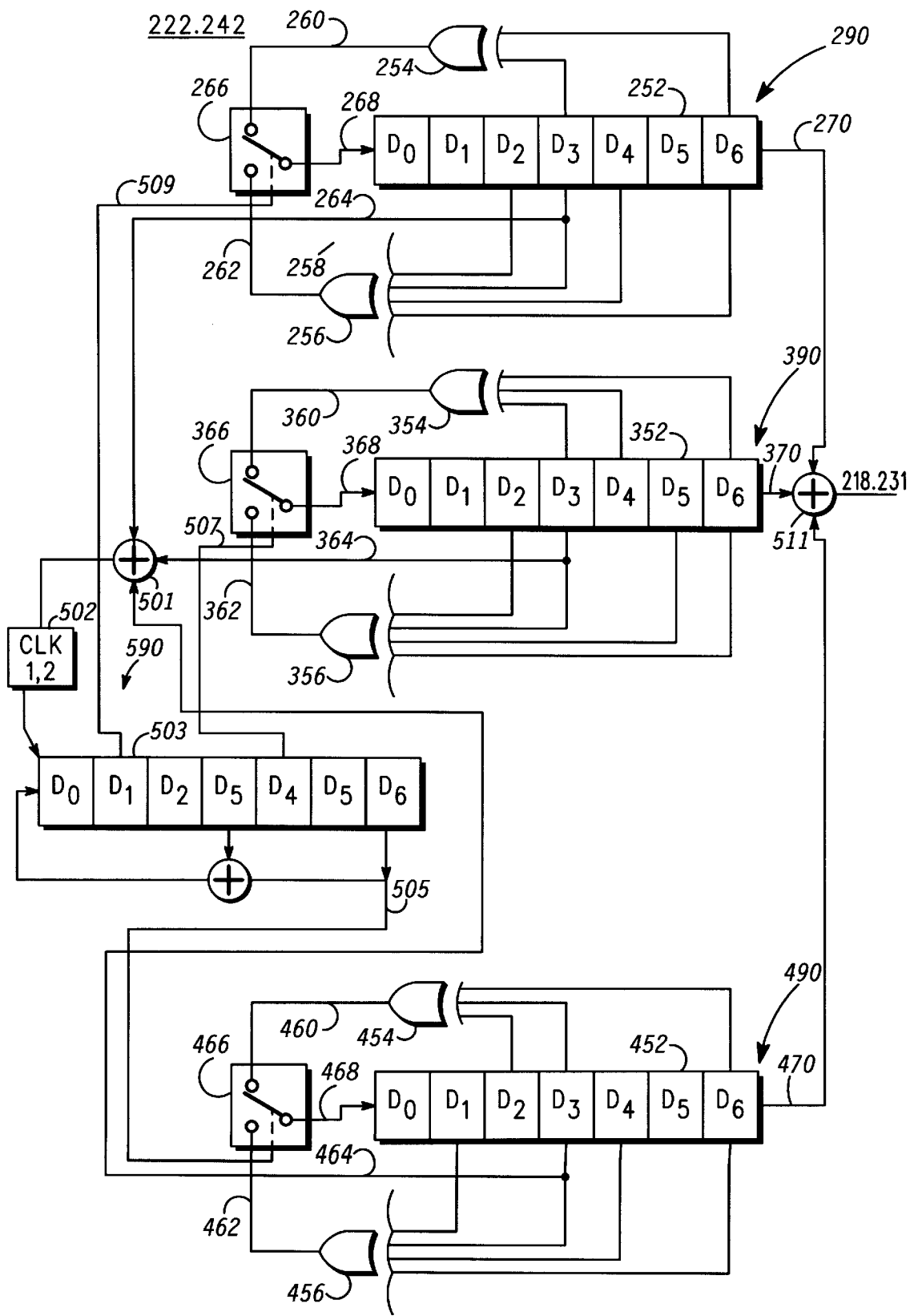
FIG. 2 is a block diagram of a preferred embodiment pseudo-random bit sequence generator in accordance with the present invention to be used in the encryption engine of either the subscriber unit or the fixed network communication unit of FIG. 1.

Turning now to FIG. 2, a block diagram of one preferred embodiment of a pseudo-random signal (i.e., bit sequence) generator 222, 242 to be used by either the subscriber unit 202 or the fixed network communication unit 200, specifically, the encryption engines 203, 211 is shown. By way of example and for the sake of simplicity only, a seven bit pseudo-random bit sequence generator 222, 242 is described. However, it will be appreciated by those skilled in the art that larger pseudo-random bit sequence generators may be used in encrypting an information signal to provide better cryptographic protection of the information signal (i.e., it is more difficult to "break" or "crack" longer non-linear sequences than shorter ones, specifically the preferred embodiment uses 32 bit sequence generators). In addition, the use of these larger pseudo-random bit sequence generators does not depart from the scope and spirit of the present invention.

The seven bit pseudo-random bit sequence generator 222, 242, preferably, is implemented as a plurality of sequence generators 290, 390, 490 each including a feedback register and each implementing several polynomial functions. A first sequence generator 290 bearing reference numerals in a 2xx series and by analogy two additional such sequence generators 390, 490 with reference numerals in, respectively, a 3xx and 4xx series will be described. This first sequence generator 290 includes a shift register 252 for storing a predetermined number of bits (e.g., seven bits numbered $D_0$ through $D_6$). In addition, a first feedback circuit 254 is operatively coupled to the shift register 252. In the preferred embodiment, the first feedback circuit implements a polynomial function $x^7+x^3+1$ by "tapping" inputs for an XOR gate 254 from bits (i.e., $D_3$ and $D_6$) stored in the shift register 252. The output of XOR gate 254 determines a first input bit 260 which may be selectively input to a serial input of the shift register 252. A second feedback circuit 256 also is operatively coupled to the shift register 252. The second feedback circuit preferably implements a polynomial function $x^7+x^4+x^3+x^2+1$ by "tapping" inputs for an XOR gate 256 from bits (i.e., $D_2$, $D_3$, $D_4$, and $D_6$) stored in the shift register 252. The output of XOR gate 256 determines a second input bit 262 which may be selectively input to a serial input of the shift register 252. The first 260 and second 262 input bit are input to a feedback selection controller 266 which outputs 268 one of the two input bits to the shift register 252. Feedback selection controller 266 deterministically selects, according to an algorithm, a particular input bit (i.e., either input bit 260 or 262) to be provided to the shift register 252 such that a non-linear pseudo-random sequence may be produced by the shift register 252 and output on serial output 270 or alternatively output as a block of seven bits of a non-linear bit sequence if the register contents are read as one parallel word.

In order to ensure that the pseudo-random sequence at serial output 270 is non-linear, the pseudo-random bit sequence generator 222, 242 will need to be initialized and clocked through several cycles to randomly mix the output bit sequence. The minimal number of clock cycles required for pseudo-random mixing is N, where N is the length of the shift register 252 (in this example seven clock cycles is required). In addition, to prevent susceptibility to cryptographic attack (i.e., code breaking), the feedback selection controller 266 must not select particular input bits from the same feedback circuit 254 or 256 for more than 2N clock cycles, where N is the length of the shift register 252. By selecting input bits from different feedback circuits more often, a cryptographic attacker is prevented from using a linear equation solution attack. Finally, it will be appreciated by those skilled in the art that more that two feedback circuits may be used to further enhance the non-linearity of the pseudo-random sequence 268 serially input to shift register 252. As noted above, by analogy the sequence generators 390, 490 operate similarly although the first feedback circuit for each generates a unique polynomial, respectively, $x^7+x^5+x^4+1$ and $x^7+x^4+x^3+1$ for their respective first feedback bits while the second feedback circuit for each generates a unique polynomial, respectively, $x^7+x^6+x^4+x^2+1$ and $x^7+x^5+x^4+x+1$ for their respective second feedback bits.

The feedback selection controllers 266, 366, 466 are controlled by control lines 509, 507, 505. These control lines are some combination of the contents of a further sequence generator 590, specifically and respectively in the depicted embodiment the $D_1$, $D_4$, and $D_6$ taps. The sequence generator 590 is a LFSR arrangement that operates to provide a non-linear pseudo-random bit sequence by virtue of the manner in which the shift register 503 is clocked. A clock 502 for this register is arranged to generate either one or two clock pulses according to the output of exclusive or gate 501, with a "one" output generating a single pulse and a zero" output generating a double pulse. This random double pulse insures that sequence generator 590 contains a non-linear pseudo-random sequence of bits. Exclusive or gate 501 is driven by a combination of the contents of shift registers 252, 352, 452, specifically D3 of each shift register. It is clear to one skilled in the art that more complex versions of the contents of these shift registers may be used without detracting from the spirit and scope of the invention. In any event as the contents of shift register 503 are modified control lines 509, 507, 505 are toggled in a random manner between two polarities and this toggles randomly feedback selection controllers 266, 366, 466 so as to select randomly between the respective first and second feedback bits for the sequence generators 290, 390, 490. To summarize, the pseudo-random bit sequence generator 222, 242 may be used to generate one non-linear pseudo-random signal or bit sequence 218, 238 by combining three such bit sequences, namely, the sequence at output 270, 370, 470 with an exclusive or function 511. Alternatively, the sequences at these outputs may be independently used as nonlinear pseudo-random bit sequences or the contents of the shift registers 252, 352, 452 may be used as a block of random bits.

Figure 4A:
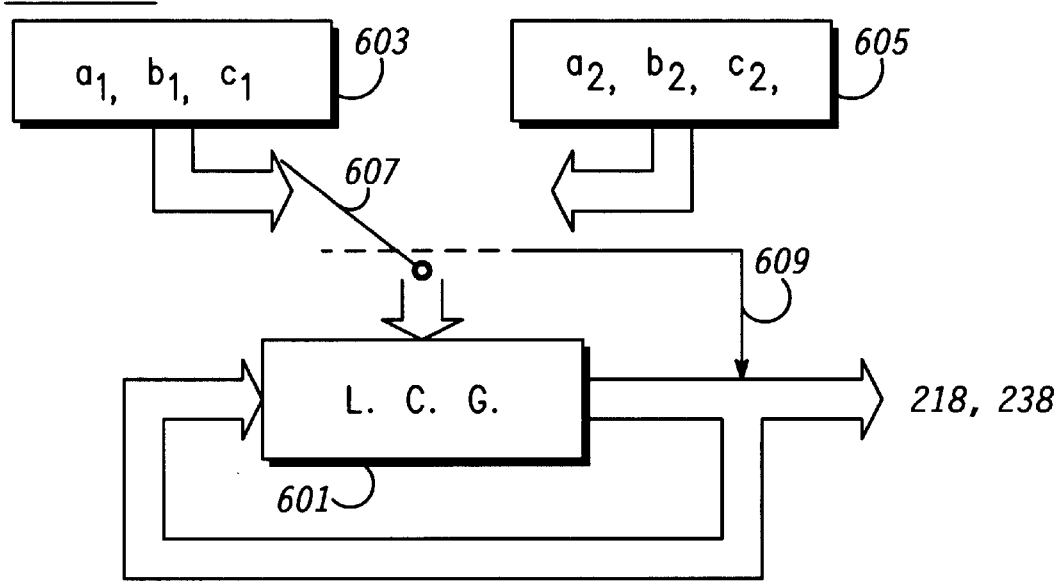
FIG. 4A is a block diagram of a first alternative preferred embodiment pseudo-random bit sequence generator in accordance with the present invention to be used in the encryption engine of either the subscriber unit or the fixed network communication unit of FIG. 1.

Turning to FIG. 4A an alternative embodiment of a pseudo-random number generator 222, 242 will be described. Generally the apparatus of FIG. 4A is based on a linear congruential generator (LCG) that evaluates $x(n+1)=\{a*x(n)+b\}$ mod c, where $x(n+1)$ is the next number of a sequence, $x(n)$ is the immediately preceding number in the sequence and a, b, and c are constants. Specifically, FIG. 4A depicts a non-linear pseudo-random number generator 222, 242 that includes a number generator 601, preferably a linear congruential generator, for generating a pseudo-random number sequence which numbers may be converted to a serial bit stream 218, 238, each number of the pseudo-random number sequence being a linear combination of a preceding number and a set of constants as in the above equation, and a controller 607, responsive to the pseudo-random number or more specifically a bit from the pseudo-random number, at input 609, for providing the set of constants from a plurality of sets of constants 603, 605 stored, preferably in read only memory as 32 bit numbers, thereby insuring that the pseudo-random number sequence is non-linear. Generally the controller 607 selects the first set of constants 603 if the bit from the random number is "one" and the second set of constants 605 if the bit is "zero". This implementation of a pseudo-random number generator lends itself especially well to implementation in a general purpose microprocessor such as Motorola MCM68000 or DSP56000.

Figure 4B:
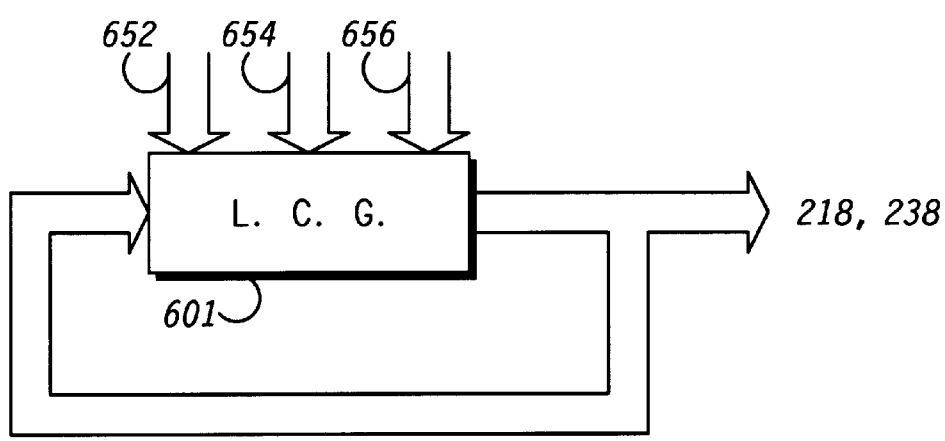
FIG. 4B is a block diagram of a second alternative preferred embodiment pseudo-random bit sequence generator in accordance with the present invention to be used in the encryption engine of either the subscriber unit or the fixed network communication unit of FIG. 1.

Referring to FIG. 4B a further alternative embodiment of a PN number generator 222, 242 is depicted. Here again non-linearity is introduced to an LCG structure. In this instance rather than switching between a plurality of sets of constants as in the FIG. 4A the constants are replaced by variables. Specifically, FIG. 4B depicts a non-linear pseudo-random number generator that includes a number generator 601, from FIG. 4A, for generating a pseudo-random number sequence which may be converted to a serial bit stream and used as PN sequence 218, 238, each number of the pseudo-random number sequence being a linear combination of a preceding number and a set of variables 652, 654, 656, and a variable generator, such as the sequence generators of FIG. 2 coupled to the number generator for providing the set of variables, supplied preferably from the shift registers 252, 352, 452 of FIG. 2 thereby insuring that said pseudo-random number sequence is non-linear.

The encryption engine that generates said pseudo-random number sequence is particularly suitable for implementation in software programs for execution on a general purpose processor. The encryption engine evaluates mathematically the equation x(n+1)=x(n)*R1+R2 mod R3. Specifically, a pseudo-random number generator suitable for use as the encryption engine 211, 203 of FIG. 1 and having improved throughput is depicted.

Figure 3A:
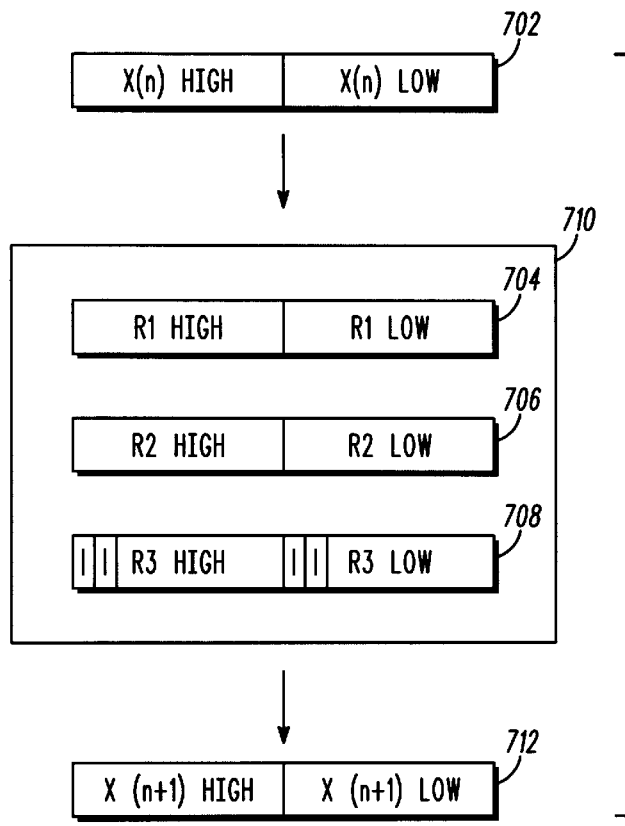
FIGS. 3A and 3B are block diagrams of an alternative embodiment of the encryption engine to be used in either the subscriber unit or the fixed network communication unit of FIG. 1.
Figure 3B:
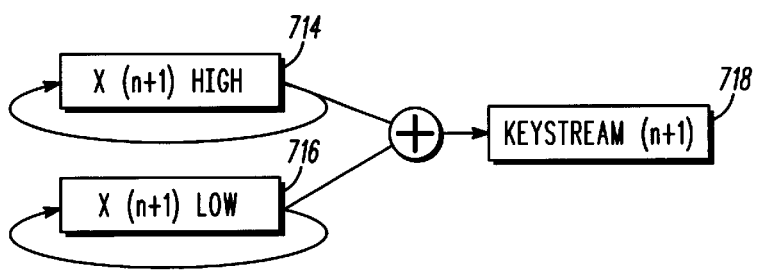

The present invention is best suited for encryption of plaintext data blocks (ideally, multiples of 2 bytes, but this is not required). As shown in FIGS. 3A–3B, a classic linear congruential generator is used:

$$x(n+1)=a*x(n)+b \bmod c$$

wherein x(n) is the last existing value register 702 and the fixed values a, b, and c are replaced by shift registers, namely the registers R1, R2, and R3 (slightly modified as set forth below) 704, 706, 708, respectively, shown as one unit 710. In a typical implementation, the shift registers are 32 bits long. A fourth shift register, R4, controls the tap configuration of these registers. The value of register x(n+1) 712 represents the output of one iteration of the process. Each iteration produces 16 bits of output as explained below. The group of five registers 702, 704, 706, 708, 712 is illustrated in FIG. 3A.

The present invention has four primary inputs: a cryptovariable or key (CIPHERKEY), a counter variable (CIPHERCNTR), a frame count (CIPHERSIZE), and a Privacy Algorithm Version (PAV) number. The cryptovariable, or CIPHERKEY, is a 64-bit quantity that is shared between the subscriber unit and the infrastructure prior to execution of the algorithm.

The invention utilizes the count variable CIPHERCNTR to ensure that any given CIPHERBLOCK will be uncorrelated with any other CIPHERBLOCK. The subscriber unit and the infrastructure should select an initial value of CIPHERCNTR in a way that guarantees that each side can maintain synchronized values of the count for the duration of the session. The MSB of CIPHERCNTR is used to indicate the direction of the transmission; a zero indicates that the data is from the subscriber unit, and a one indicates that the data is from the infrastructure side. This use of the MSB also ensures that each direction of traffic will be encrypted independently. In one embodiment CIPHERCNTR is incremented by one after one complete CIPHERBLOCK has been generated.

CIPHERSIZE is the total number of CIPHERBLOCKS that will be generated. The PAV value is used during the initialization procedures, which are described below.

The output of one iteration is a 16-bit quantity, x(n+1). Multiple 16-bit values can be concatenated to produce CIPHERBLOCKS of arbitrary length. For example, the engine executes 20 iterations to generate a 16*20=320-bit CIPHERBLOCK for encrypting 320-bit plaintext frames.

The output of each iteration of the present invention is a 16-bit quantity instead of a single bit. The output is described by $$x(n+1)=a*x(n)+b \bmod c$$

where a, b, and c are 32-bit LFSR's, namely, registers R1, R2, and R3. The values x(n) and x(n+1) represent the previous and current 32-bit output values.

The present invention can run on small microprocessors (e.g. 16 bit machines). Therefore, it is desirable to use a shortened representation of the quantities described above in the computations. The present invention generates a 16-bit output by operating on the 16 LSB's or MSB's representing numerical values in registers R1, R2, and R3 (represented $Rx_{low}$ or $Rx_{high}$, respectively) and x(n). The two MSB's of both 16-bit values taken from register R3 are always set to '11' to ensure that the associated modular arithmetic operations can produce 16-bit values regardless of R3's contents. Note that the registers are initialized according to the Table.

The output value x(n+1) is processed in separate parts (low and high 16-bit quantities). The low and high portions are determined by computing the quantities shown below, then rotating the low portion, for example, three bits to the left, and the high portion three bits to the right. The number of bits used in the rotation for the low portion does not have to equal the number of bits used in the rotation for the high portion.

$$x(n+1)_{low}=\{x(n)_{low}*R1_{low}+R2_{low}\} \bmod R3_{low}$$

$$x(n+1)_{high}=\{x(n)_{high}*R2_{high}+R1_{high}\} \bmod R3_{high}$$

As shown in FIG. 3B, the 16-bit keystream output value 718 is produced by XORing the rotated high 714 and low 716 portions of x(n+1), for example, by 3 bits to the left and right, respectively.

The contents of a fourth LFSR (register 503) are used to select one of two possible tap configurations for the R1, R2, and R3 LFSR's. The R1, R2, R3, and R4 LFSRs are similar to those shown in FIG. 2, except that the registers in this embodiment are 32 bits long. The LFSR selection procedure and clocking for R4 have also been carried over from FIG. 2.

Initialization takes place prior to generation of each CIPHERBLOCK and consists of these steps: The feedback selection controllers f1, f2, and f3, which control tap configuration selection for LFSR's, R1, R2, and R3, are all set to 0. Each of the four LFSR's (R1, R2, R3, and R4) are initialized. The initialization value of each LFSR is a function of the 64-bit CIPHERKEY (represented as high and low 32-bit quantities $key_{high}$ and $key_{low}$), 32-bit PAV, and current 32-bit CIPHERCNTR. The value of x(n) is also set to a value that is a function of these variables. The value loaded into each location is shown in the Table below. Each LFSR is also logically ORed with a 32-bit field that has exactly one bit set. This ensures that each of the LFSR's does not end up with an initial value of all zeroes. That situation would cause the LFSR to generate zeroes only.

The engine is 'clocked' 4 times to 'mix up' the registers.

TABLE

| REGISTER | INITIAL VALUE |
| --- | --- |
| LFSR R1 | $key_{high}$ XOR PAV |
| LFSR R2 | $key_{low}$ |
| LFSR R3 | complement ($key_{high}$) |
| LFSR R4 | complement ($key_{low}$) XOR complement (PAV) |
| x(0) | $key_{low}$ XOR $key_{high}$ XOR PAV |

Upon completion of the initialization process, the parameter CIPHERSIZE determines the number of CIPHERBLOCKs that are generated. For each iteration, a 16-bit output word is generated. 'N' output words may be concatenated to generate CIPHERBLOCKs of size N*16 bits. If input plaintext blocks are not a multiple of 16 bits, extra bits of the CIPHERBLOCK may be discarded.

In a preferred embodiment, the present invention includes a computer usable medium/memory having computer readable program code thereon that includes code for generating a unique keystream output value for every frame of bearer traffic to provide an output from a combination of $x(n+1)_{low}$ and $x(n+1)_{high}$ in accordance with equations of a form:

$$x(n+1)_{low}=\{x(n)_{low}*R1_{low}+R2_{low}\} \bmod R3$$

$$x(n+1)_{high} = \{x(n)_{high} * R2_{high} + R1_{high}\} \bmod R3_{high}$$

where R1, R2, and R3 are linear feedback shift registers, R4 is a shift control register coupled to a clock utilized for tap configuration control of R1, R2 and R3, and values x(n) and x(n+1) represent previous and current output values. The computer readable program code includes the steps of: initializing R1, R2, R3 and R4 according to a predetermined scheme; generating the output by operating on one of: a first and second predetermined selection of bits of registers R1, R2, and R3; and where the first selection of bits are represented by $Rx_{low}$ and the second selection of bits are represented by $Rx_{high}$, respectively, where x=1, 2, 3; setting a two most significant bits of the first selection of bits and of the second selection of bits in register R3 to '11'; processing x(n+1) in separate low and high bit portions, wherein the low and high bit portions are determined by computing:

$$x(n+1)_{low} = \{x(n)_{low} * R1_{low} + R2_{low}\} \bmod R3_{low}$$

$$x(n+1)_{high} = \{x(n)_{high} * R2_{high} + R1_{high}\} \bmod R3_{high}$$

then rotating the low portion a first predetermined number of bits, and the high portion a second predetermined number of bits and producing a keystream output value by a logic exclusive-OR operation on rotated high and low portions. In one embodiment, the high portion includes the half of the register having the most significant bits, and the low portion includes the half of the register having the least significant bits.

Typically, the low portion is rotated 3 bits to the left, and the high portion is rotated 3 bits to the right.

It will be apparent to those skilled in the art that the disclosed invention may be modified in numerous ways and may assume many embodiments other than the preferred form specifically set out and described above. For example, while two particularly advantageous embodiments of the encryption engines have been discussed, others of different circuit topology clearly exist. Accordingly, it is intended by the appended claims to cover all modifications of the invention which fall within the true spirit and scope of the invention.

What is claimed is:

1. An encryption method for generating a unique keystream output value for every frame of bearer traffic to provide an output from a combination of $x(n+1)_{low}$ and $x(n+1)_{high}$ in accordance with equations of a form:

$$x(n+1)_{low} = \{x(n)_{low} * R1_{low} + R2_{low}\} \bmod R3_{low}$$

$$x(n+1)_{high} = \{x(n)_{high} * R2_{high} + R1_{high}\} \bmod R3_{high}$$

where R1, R2, and R3 are linear feedback shift registers, R4 is a shift control register coupled to a clock utilized for tap configuration control of R1, R2 and R3, and values x(n) and x(n+1) represent previous and current output values, the encryption method comprising the steps of:

initializing R1, R2, R3 and R4 according to a predetermined scheme;

generating the output by operating on one of:
a first and second predetermined selection of bits of registers R1, R2, and R3; and
where the first selection of bits are represented by $Rx_{low}$ and the second selection of bits are represented by $Rx_{high}$, respectively, where x=1, 2, 3;

setting a two most significant bits of the first selection of bits and of the second selection of bits in register R3 to '11';

processing x(n+1) in separate low and high bit portions, wherein the low and high bit portions are determined by computing:

$$x(n+1)_{low} = \{x(n)_{low} * R1_{low} + R2_{low}\} \bmod R3_{low}$$

$$x(n+1)_{high} = \{x(n)_{high} * R2_{high} + R1_{high}\} \bmod R3_{high}$$

then rotating the low portion a first predetermined number of bits, and the high portion a second predetermined number of bits and producing a keystream output value by a logic exclusive-OR operation on rotated high and low portions.

2. The method of claim 1 wherein the low portion is rotated 3 bits to the left, and the high portion is rotated 3 bits to the right.

3. An encryption device for generating a unique keystream output value for every frame of bearer traffic to provide an output from a combination of $x(n+1)_{low}$ and $x(n+1)_{high}$ in accordance with equations of a form:

$$x(n+1)_{low} = \{x(n)_{low} * R1_{low} + R2_{low}\} \bmod R3_{low}$$

$$x(n+1)_{high} = \{x(n)_{high} * R2_{high} + R1_{high}\} \bmod R3_{high}$$

where R1, R2, and R3 are linear feedback shift registers, R4 is a shift control register coupled to a clock utilized for tap configuration control of R1, R2 and R3, and values x(n) and x(n+1) represent previous and current output values, the encryption device comprising:

three linear feedback shift registers R1, R2, and R3, each coupled to a separate switch and a fourth linear feedback shift register R4 to provide alternate tap configurations to an logical exclusive-OR unit that provides an logical exclusive-OR output wherein a clock is coupled to R4 and to a summer that is coupled to R1, R2 and R3, wherein R4 and the switch are utilized to select a tap configuration, and R1, R2, R3 and R4 are initialized prior to each output determination according to a predetermined scheme, wherein the R1, R2, and R3 generate an output by operating on one of a first and second predetermined selection of bits of registers R1, R2, and R3; and where the first selection of bits are represented by $Rx_{low}$ and the second selection of bits are represented by $RX_{high}$, respectively, where x=1, 2, 3;

a two most significant bits of the first selection of bits and of the second selection of bits in register R3 are set to '11';

x(n+1) is processed in separate low and high bit portions, wherein the low and high bit portions are determined by computing:

$$x(n+1)_{low} = \{x(n)_{low} * R1_{low} + R2_{low}\} \bmod R3_{low}$$

$$x(n+1)_{high} = \{x(n)_{high} * R2_{high} + R1_{high}\} \bmod R3_{high}$$

then rotating the low portion a first predetermined number of bits, and the high portion a second predetermined number of bits and producing a keystream output value by a logical exclusive-OR operation on rotated high and low portions.

4. The encryption device of claim 3 wherein the low portion is rotated 3 bits to the left, and the high portion is rotated 3 bits to the right.

5. A computer usable medium/memory having computer readable program code means thereon comprising:

means for generating a unique keystream output value for every frame of bearer traffic to provide an output from a combination of $x(n+1)_{low}$ and $x(n+1)_{high}$ in accordance with equations of a form:

$$x(n+1)_{low} = \{x(n)_{low} * R1_{low} + R2_{low}\} \bmod R3_{low}$$

$$x(n+1)_{high} = \{x(n)_{high} * R2_{high} + R1_{high}\} \bmod R3_{high}$$

where R1, R2, and R3 are linear feedback shift registers, R4 is a shift control register coupled to a clock utilized for tap configuration control of R1, R2 and R3, and values $x(n)$ and $x(n+1)$ represent previous and current output values, the computer readable program code means including the steps of:

initializing R1, R2, R3 and R4 according to a predetermined scheme;

generating the output by operating on one of:
   a first and second predetermined selection of bits of registers R1, R2, and R3; and
   where the first selection of bits are represented by $Rx_{low}$ and the second selection of bits are represented by $Rx_{high}$, respectively, where x=1, 2, 3;

setting a two most significant bits of the first selection of bits and of the second selection of bits in register R3 to '11';

processing $x(n+1)$ in separate low and high bit portions, wherein the low and high bit portions are determined by computing:

$$x(n+1)_{low} = \{x(n)_{low} * R1_{low} + R2_{low}\} \bmod R3_{low}$$

$$x(n+1)_{high} = \{x(n)_{high} * R2_{high} + R1_{high}\} \bmod R3_{high}$$

then rotating the low portion a first predetermined number of bits, and the high portion a second predetermined number of bits and producing a keystream output value by a logical exclusive-OR operation on rotated high and low portions.

6. The computer usable medium/memory of claim 5 wherein the low portion is rotated 3 bits to the left, and the high portion is rotated 3 bits to the right.

* * * * *